(12) United States Patent
Laue

(10) Patent No.: US 7,584,986 B2
(45) Date of Patent: Sep. 8, 2009

(54) AIRBAG MODULE

(75) Inventor: Andreas Laue, Elsenfeld (DE)

(73) Assignee: Takata-Petri AG, Aschaffenburg (DE)

( * ) Notice: Subject to any disclaimer, the term of this patent is extended or adjusted under 35 U.S.C. 154(b) by 68 days.

(21) Appl. No.: 10/951,790

(22) Filed: Sep. 29, 2004

(65) Prior Publication Data

US 2005/0067818 A1 Mar. 31, 2005

(30) Foreign Application Priority Data

Sep. 30, 2003 (DE) .............. 203 15 347 U

(51) Int. Cl.
*B60R 21/16* (2006.01)
(52) U.S. Cl. .................. 280/728.2; 280/731; 280/743.1
(58) Field of Classification Search ............. 280/728.1, 280/728.2, 731, 743.1
See application file for complete search history.

(56) References Cited

U.S. PATENT DOCUMENTS

| | | | | |
|---|---|---|---|---|
| 4,913,461 A * | 4/1990 | Cuevas | ........................ | 280/731 |
| 4,986,569 A * | 1/1991 | Bruton | ...................... | 280/728.2 |
| 5,176,400 A * | 1/1993 | McGuire et al. | .......... | 280/728.2 |
| 5,275,431 A * | 1/1994 | Stephens | .................. | 280/728.2 |
| 5,518,266 A * | 5/1996 | O'Docherty et al. | ...... | 280/728.2 |
| 5,577,763 A * | 11/1996 | Cuevas | ..................... | 280/728.2 |
| 5,692,771 A | 12/1997 | Milne, III et al. | | |
| 5,845,928 A * | 12/1998 | Nelsen et al. | ............. | 280/728.2 |
| 5,992,874 A | 11/1999 | Sugiyama et al. | | |
| 6,250,665 B1 | 6/2001 | Sutherland et al. | | |
| 6,371,507 B1 * | 4/2002 | Durrani et al. | ............ | 280/728.2 |
| 6,431,583 B1 * | 8/2002 | Schneider | ................. | 280/728.2 |
| 6,439,599 B1 | 8/2002 | Laue et al. | | |
| 6,536,801 B2 * | 3/2003 | Frisch | ...................... | 280/743.1 |
| 6,592,141 B1 * | 7/2003 | Dancasius et al. | ......... | 280/728.2 |
| 6,695,344 B2 * | 2/2004 | Hauer | ......................... | 280/731 |
| 6,702,318 B2 * | 3/2004 | Rose et al. | ............... | 280/728.2 |
| 6,824,163 B2 * | 11/2004 | Sen et al. | .................. | 280/728.2 |
| 2002/0117835 A1 * | 8/2002 | Schneider | ................. | 280/728.2 |
| 2002/0149177 A1 * | 10/2002 | Rose et al. | ............... | 280/728.2 |
| 2002/0149178 A1 * | 10/2002 | Whited et al. | ............. | 280/728.2 |
| 2002/0158456 A1 * | 10/2002 | Fischer | ..................... | 280/743.2 |
| 2003/0146604 A1 * | 8/2003 | Sen et al. | .................. | 280/728.2 |
| 2004/0155436 A1 * | 8/2004 | Saiguchi et al. | ........... | 280/728.1 |
| 2005/0104336 A1 * | 5/2005 | Schneider et al. | ......... | 280/728.2 |
| 2006/0091647 A1 * | 5/2006 | Kawabe et al. | ............ | 280/728.2 |
| 2006/0108775 A1 * | 5/2006 | Schirholz et al. | .......... | 280/728.2 |

FOREIGN PATENT DOCUMENTS

| | | |
|---|---|---|
| CN | 2071153 U | 2/1991 |
| DE | 39 39 021 C1 | 11/1990 |
| DE | 42 42 137 A1 | 6/1993 |
| DE | 43 00 111 A1 | 7/1993 |
| DE | 42 33 751 A1 | 4/1994 |
| DE | 195 39 164 A1 | 4/1996 |
| DE | 196 45 217 A1 | 5/1998 |
| EP | 1 113 948 B1 | 7/2001 |
| JP | 6-122354 * | 5/1994 .............. 280/728.2 |
| JP | 6-59164 | 8/1994 |
| JP | 10-71910 | 3/1998 |

* cited by examiner

*Primary Examiner*—Eric Culbreth
(74) *Attorney, Agent, or Firm*—Foley & Lardner LLP

(57) ABSTRACT

An airbag module including an airbag and an arrangement for fastening the airbag in which the airbag is fastened by means of a clamping connection. The arrangement includes a form-fitting connecting section provided in the region of the clamping connection.

8 Claims, 3 Drawing Sheets

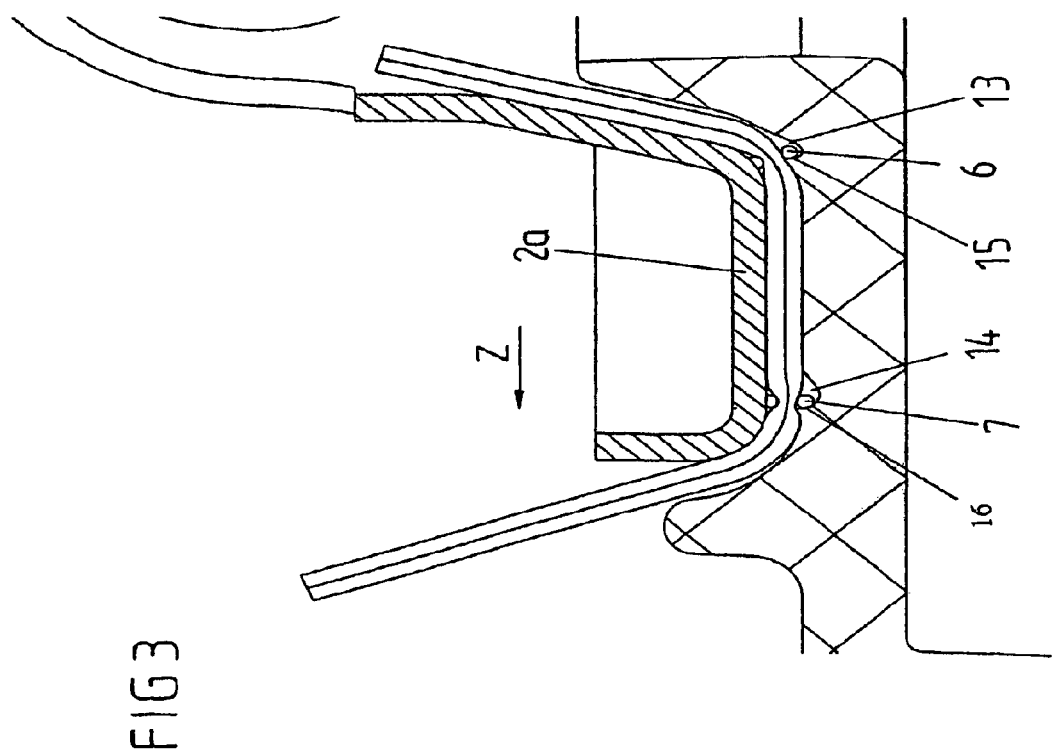

AIRBAG MODULE

BACKGROUND OF THE INVENTION

The invention relates to an airbag module.

European Patent 1 113 948 B1 (incorporated by reference herein) discloses an airbag module with a vibration damper for a steering wheel. In this airbag module, a diffuser and an airbag are fastened on a horizontal section of the module housing by means of screws. In this case, the airbag mouth lies flat between this horizontal section and the diffuser and is clamped between the two by means of the screws. In order to prevent the airbag mouth from tearing off when the airbag is deployed, the apertures for the screws in the airbag have to be of reinforced design. Furthermore, high nut tightening torques are required in order to achieve a secure clamping. This requires a great material thickness and a multiplicity of screws, as a result of which these arrangements are difficult and require a considerable outlay on installation.

Furthermore, German Laid-Open Specification 42 33 751 A1 (incorporated by reference herein) discloses an occupant restraint system, in which the airbag is fastened to a housing by means of profiled strips which can be inserted in a form-fitting manner into complementary mating profiles on the housing, with the result that fastening screws can be omitted at these fastening points. These profiled strips can be latched or locked on the mating profile in a sideways direction with respect to their longitudinal axis or can be inserted in the longitudinal direction into the mating profile. This saves on installation costs and weight because of the omission of the fastening screws.

However, this arrangement is suitable only for front passenger airbags, since the latching or locking in the sideways direction initially requires a lateral displacement over and beyond the mating profile in order subsequently to then be pressed into the latter. This is possible in the case of a front passenger airbag module, in which the housing generally has a rectangular opening for accommodating the blow-in mouth of the airbag. Since the airbag is expandable, two profiled strips running in the direction of the longitudinal sides of the housing opening can therefore easily be moved over the mating profile on the housing. The airbag is then fastened to the narrow sides of the housing in a conventional manner by means of bolts or pins.

Since, on account of the generally cylindrical gas generator, the housing of a driver's airbag module also has a circular opening on which the airbag has to be fastened, the blow-in mouth of the airbag also has to be circular. The profile would therefore likewise have to be a closed, rigid circular ring, meaning that a lateral displacement over the mating profile on the housing is not possible.

However, an insertion of the profile in its longitudinal direction is also not possible because of the circular ring shape.

SUMMARY OF THE INVENTION

According to an embodiment of the invention, an airbag module is provided that includes an arrangement for airbag fastening configured in such a manner that weight and installation costs can be saved and that the airbag clamping force can be reduced.

According to an embodiment of the invention, in an arrangement for fastening an airbag in a driver's airbag module in which the airbag is fastened by means of a clamping connection, in particular for an airbag module with a vibration damper, provision is made according to the invention for at least one form-fitting connecting section to be provided in the region of the clamping connection. The combination of the clamping connection with a form-fitting connection in the region of the clamping connection means that it is possible, on the one hand, to design the form-fitting connection in such a manner that it can easily be fitted even in the case of a circular blow-in opening of the airbag and corresponding opening in the module housing and, on the other hand, the clamping forces can be reduced because of the form-fitting connection, i.e. fewer connecting screws are required. Since the airbag is not held on the housing solely by means of a form-fitting connection, but in addition by means of the clamping forces, there are a multitude of design possibilities for the form-fitting connection.

The form-fitting clamping connection is preferably provided between a generator support and a diffuser of the airbag module.

It is expedient for at least one depression for at least one projection present on the airbag to be provided in the generator support, the depression being designed in such a manner that the projection, at least when loaded in the tensioning direction of the airbag, bears against a wall of the depression when the airbag is deployed. The advantage resides in the fact that, because of the additional clamping action, a simple depression, e.g. a groove or slot, is sufficient in order to obtain a form-fitting connection. Since the clamping only has the task of preventing the projection of the airbag from sliding out of the depression in the event of the airbag being deployed, the clamping forces can be substantially lower than in the case of a pure frictional fastening of the airbag. Secondly, the simple shape which is possible for the depression means that the projection of the airbag can easily be inserted into the depression. The reduction in the clamping forces prevents the gas generator from being functionally impaired in terms of being a vibration damper.

It is sufficient for the depression to have, on the side against which the projection bears when the airbag is deployed, a wall running at least approximately perpendicularly with respect to the tensioning direction of the airbag.

It is expedient to provide at least one encircling depression having a corresponding profile to the housing opening for accommodating the blow-in mouth of the airbag. In a further refinement, two depressions running concentrically are provided. The encircling depression may also have at least one interruption.

The depressions are preferably provided on the supporting surface for fastening bolts for the clamping of the airbag.

In one variant, depressions are provided around fastening bolts for the clamping of the airbag.

In one embodiment, at least one seam which is present on the edge of the blow-in mouth is provided as the projection. The form-fitting connection between the seam and the depression is sufficient, on account of the additionally provided clamping force, in order to securely hold the airbag during its deployment.

However, at least one component which is connected to the airbag may also be provided as the projection, the component preferably having a circular ring-shaped profile. The advantage of the invention is that a profile of this type, even if it is rigid, can, because of the simple depression, easily be inserted into the latter during the installation of the airbag.

In a further refinement of the invention, provision is made for the generator support to have, within the diffuser, a protective edge pointing in the direction thereof, the edge of the blow-in mouth extending at least as far as a gap between the protective edge and the diffuser. As a result, the airbag, in particular in the region of the projections on the airbag, is protected against the direct gas jet from the gas generator, thereby making it possible for a thermal sealing of the fabric edge of the blow-in mouth to be dispensed with.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 shows the detail B of FIG. 1 together with a second embodiment of the airbag fastening.

DETAILED DESCRIPTION

Figure 1:
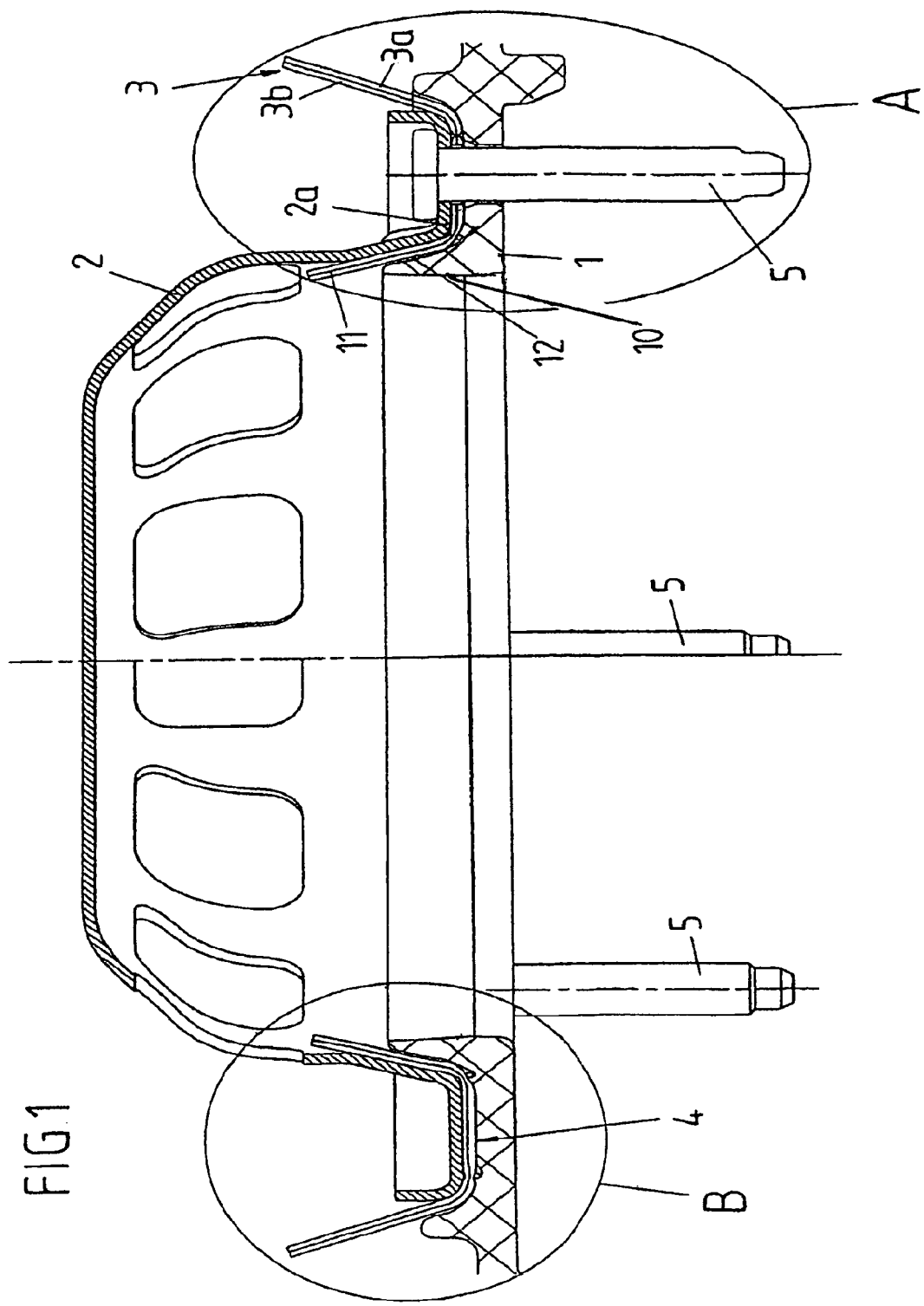
FIG. 1 shows cross sections through a section of a generator support and through a diffuser section.
Figure 2:
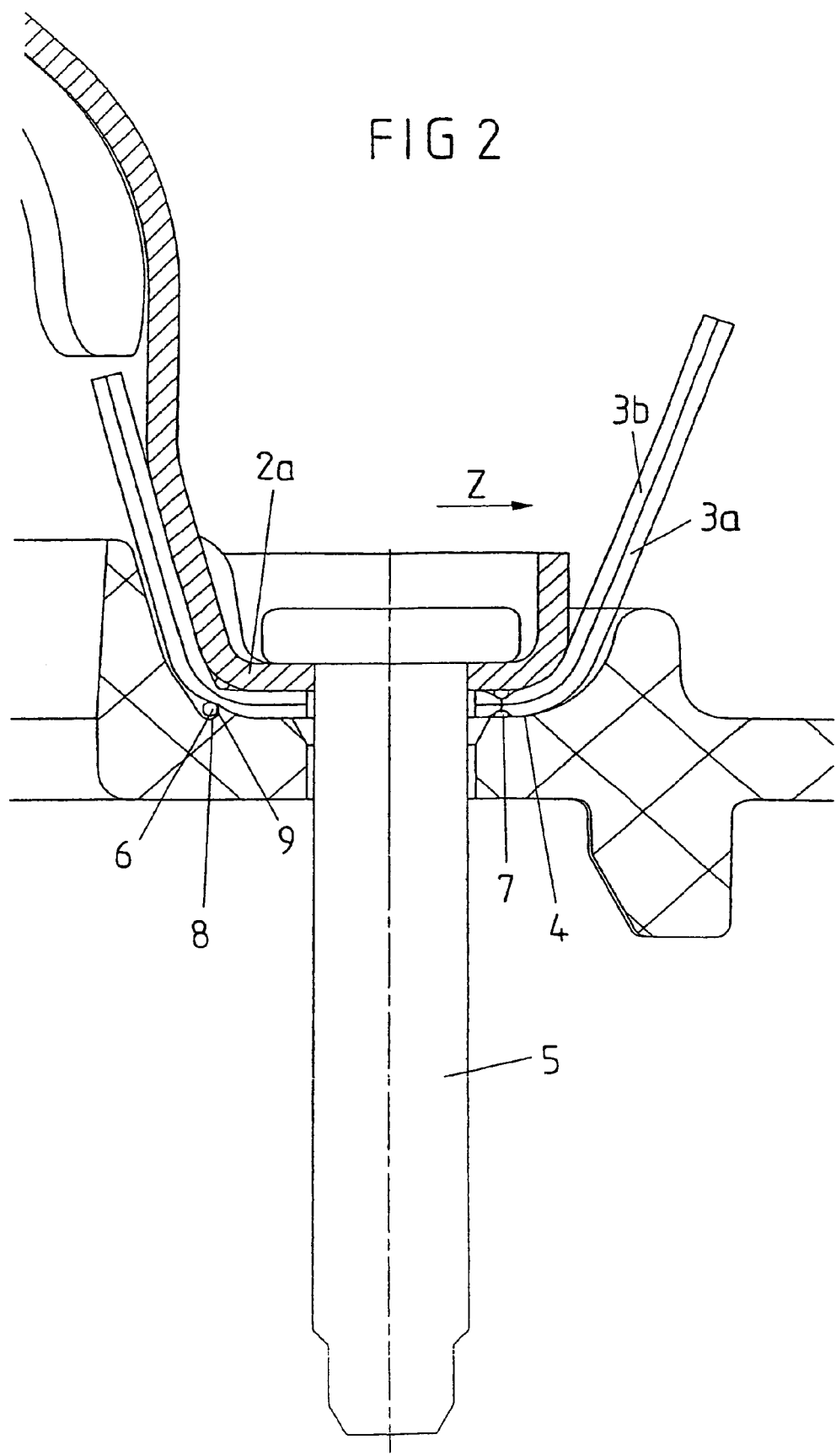
FIG. 2 shows the detail A of FIG. 1 together with a first embodiment of the airbag fastening.

FIG. 1 illustrates respective sections of a generator support 1 over which a diffuser 2 extends. Between the two sections, the edge 11 of the blow-in mouth of an airbag 3 is situated on the supporting surface 4 for fastening bolts 5. In this region, the airbag 3 has two layers 3a, b. However, the airbag 3 may also have further layers in this region. The airbag 3 may be a driver side airbag module. Concentric seams 6, 7 run along the edge 11 of the blow-in mouth of the airbag (FIGS. 2, 3). The generator support has a protective edge 10, and the edge 11 of the airbag mouth extends through a gap 12 between the protective edge 10 and the diffuser 2 into the latter. The protective edge 10 has the effect that the hot gases of the gas generator (not illustrated) do not reach the region of the edge 11 with the seam 6.

In a first embodiment, which is illustrated on the right-hand side of the centre line in FIG. 1 and also in FIG. 2, the bearing surface 4 has a depression 8 which has a corresponding profile to the seam 6, i.e. constitutes an encircling groove. However, this groove may also be partially encircling if the seam is of likewise corresponding design. This depression has a wall 9 which runs perpendicularly with respect to the tensioning direction Z, in which the airbag is pulled during its deployment. Tightening of the fastening bolts 5 causes the seam 6 on the side of the airbag layer 3a to be pressed into the depression 8. On the side of the airbag layer 3b, the seam 6 is pressed into this airbag layer on account of the absence of a corresponding depression in the diffuser 2. In the case of both airbag layers 3a, b, the seam 7 is pressed into these airbag layers on account of the absence of depressions in the generator support 1 and in the diffuser 2.

During its deployment in the region of the bearing surface 4, the airbag 3 is stressed in the Z-direction. As a result, the seam 6 is pressed against the wall 9. This form-fitting connection means that the airbag 3 is prevented from pulling out of its fastening. The contact pressure of the fastening bolts 5 merely has to be large enough to prevent the seam 6 from sliding out of the depression 8.

According to a second exemplary embodiment, which is illustrated on the right-hand side of the centre line of FIG. 1 and in FIG. 3, two encircling depressions 13, 14 are provided in the supporting surface 4 and respectively have walls 15 and 16 which run perpendicularly with respect to the tensioning direction Z, in which the airbag is pulled during its deployment. As in the first embodiment, the depressions may be partially encircling in the case of this embodiment, too. The seam 6 is situated in the depression 13 and, in addition, the seam 7 is situated in the depression 14. This reliably prevents the airbag from tearing out of the fastening.

Instead of the seams 6, 7, it is also possible for fixed rings to be mounted, e.g. sewn, on the airbag, which rings, with the envisaged shape of the depressions, can be inserted into the latter without any problem.

Furthermore, the depressions can run around the fastening bolts 5, and seams on the airbag or the fixed rings which are connected to the airbag are assigned to them.

As a result of the clamping action of the diffuser edge 2a, which rests on the edge 11 of the blow-in mouth, in the case of this combined form-fitting and frictional clamping, substantially fewer fastening bolts are required than in the case of a purely frictional clamping of the airbag. Three to four fastening bolts are sufficient for a secure clamping.

The priority application, Germany Patent Application No. 203 15 347, filed Sep. 30, 2003, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a driver side of a vehicle comprising a clamping mechanism that is configured to provide a form-fitting connecting section between an airbag and a generator support;
   wherein the generator support includes at least one depression for at least one projection present on the airbag, the depression being designed in such a manner that the projection, at least when loaded in a tensioning direction (Z) of the airbag, bears against a wall of the depression when the airbag is deployed;
   wherein a clamping connection of the form-fitting connecting section is provided between a generator support and a diffuser of the airbag module;
   wherein the generator support includes a protective edge pointing in a direction of the diffuser so that an edge of a blow-in mouth of the airbag extends through a gap between the protective edge and the diffuser and past the protective edge.

2. The module of claim 1, wherein the at least one depression has, on a side against which the projection bears when the airbag is deployed, a wall running at least approximately perpendicularly with respect to the tensioning direction (Z) of the airbag.

3. The module of claim 1, wherein the at least one depression is provided on a supporting surface for fastening bolts for clamping of the airbag.

4. The module of claim 1, wherein the at least one projection comprises at least one seam which is present on the edge of the blow-in mouth of the airbag.

5. The module of claim 1, wherein the at least one projection comprises at least one component which is connected to the airbag.

6. The module of claim 5, wherein the component has a circular ring-shaped profile.

7. The module of claim 1, wherein the at least one depression includes two depressions, and wherein one of the two depressions is disposed radially inward of the other of the two depressions.

8. The module of claim 1, wherein the at least one depression surrounds the blow-in mouth of the airbag for receiving inflation gas.

* * * * *